US012120492B2

(12) United States Patent
Wu et al.

(10) Patent No.: US 12,120,492 B2
(45) Date of Patent: Oct. 15, 2024

(54) NON-COHERENT NOISE REDUCTION FOR AUDIO ENHANCEMENT ON MOBILE DEVICE

(71) Applicant: MediaTek Inc., Hsinchu (TW)

(72) Inventors: Chi Sheng Wu, Hsinchu (TW); Liang-Che Sun, Hsinchu (TW); Yiou-Wen Cheng, Hsinchu (TW); Shun-Chang Zhong, Hsinchu (TW)

(73) Assignee: MediaTek Inc. (TW)

( * ) Notice: Subject to any disclaimer, the term of this patent is extended or adjusted under 35 U.S.C. 154(b) by 251 days.

(21) Appl. No.: 17/876,388

(22) Filed: Jul. 28, 2022

(65) Prior Publication Data

US 2024/0040309 A1 Feb. 1, 2024

(51) Int. Cl.

| | |
|---|---|
| ***H04R 3/00*** | (2006.01) |
| ***H04R 3/04*** | (2006.01) |
| ***H04R 5/04*** | (2006.01) |
| ***H04S 7/00*** | (2006.01) |

(52) U.S. Cl.

CPC ............... *H04R 3/04* (2013.01); *H04R 3/005* (2013.01); *H04R 5/04* (2013.01); *H04S 7/307* (2013.01); *H04R 2410/07* (2013.01)

(58) Field of Classification Search

None

See application file for complete search history.

(56) References Cited

U.S. PATENT DOCUMENTS 5,226,087 A * 7/1993 Ono ....................... H04R 3/005 381/26

2023/0129873 A1* 4/2023 Li ............................ H04R 5/04 381/98

* cited by examiner

*Primary Examiner* — James K Mooney

(74) *Attorney, Agent, or Firm* — Andy M. Han; Han IP PLLC

(57) ABSTRACT

Various techniques pertaining to non-coherent noise reduction for audio enhancement on a multi-microphone mobile device are proposed. A processor receives a plurality of signals from a plurality of audio sensors corresponding to a plurality of channels responsive to sensing by the plurality of audio sensors. The processor then performs a non-coherent noise reduction on one or more signals of the plurality of signals to suppress one or more non-coherent noises in each of the one or more signals based on a respective signal-to-noise ratio (SNR) associated with each of the one or more signals. The processor further combines the plurality of signals subsequent the noise reduction to generate an output signal.

17 Claims, 12 Drawing Sheets

800

NON-COHERENT NOISE REDUCTION FOR AUDIO ENHANCEMENT ON MOBILE DEVICE

TECHNICAL FIELD

The present disclosure is generally related to noise reduction and, more particularly, to non-coherent noise reduction for audio enhancement on a mobile device.

BACKGROUND

Unless otherwise indicated herein, approaches described in this section are not prior art to the claims listed below and are not admitted as prior art by inclusion in this section.

There are generally two types of noise, namely coherent noise and non-coherent noise, to which a multi-microphone device with two or more microphones may be exposed. Specifically, the noise that simultaneously appears on multiple microphones of a mobile device with a similar signal pattern is considered a coherence noise. In contrast, the noise that appears on the multiple microphones of the mobile device with different signal patterns is considered a non-coherent noise. For example, since the sound of a car engine picked up by the multiple microphones is from the same source (i.e., the engine or a car) and has a similar signal pattern on those microphones, it is a coherent noise. As another example, as the noise from local wind shear turbulence around each microphone results in different signal patterns on the multiple microphones, it is a non-coherent noise. That is, when a natural wind blows, different microphones receive wind noise at different times and intensities; and, as the noise detected or sensed by each microphone is local, the wind noises at different microphones have no causal relationship therebetween and thus belong to a type of non-coherent noise.

For example, with two microphones (e.g., mic0 and mic1) being mounted on different sides of a multi-microphone device, wind noise sensed by mic0 can be greater and earlier than at mic1 in case the side of the device on which mic0 is mounted is facing the wind. In a conventional method of non-coherent noise reduction, as a coherence value is calculated jointly with respect to mic0 and mic1, there is no way to determine whether a given noise is received by mic0 or mic1 when such noise is received by either but not both of mic0 and mic1. Undesirably, this could result in the signal received by the noise-free microphone (either mic0 or mic1) being erroneously suppressed. Moreover, when only one but not both of mic0 and mic1 is exposed to the noise, the noise could still be mixed into an output after beamforming.

Therefore, there is a need for a solution of non-coherent noise reduction for audio enhancement on a multi-microphone mobile device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to non-coherent noise reduction for audio enhancement on a multi-microphone mobile device. For instance, under various schemes proposed herein, each channel may be independently associated with its respective gain value with single-channel noise estimation, for which machine learning and/or deep learning model may be utilized.

In one aspect, a method may involve a processor receiving a plurality of signals from a plurality of audio sensors corresponding to a plurality of channels responsive to sensing by the plurality of audio sensors. The method may also involve a non-coherent noise estimator in the processor performing a non-coherent noise reduction on one or more signals of the plurality of signals to suppress one or more non-coherent noises in each of the one or more signals based on a respective signal-to-noise ratio (SNR) associated with each of the one or more signals. The method may further involve the processor combining the plurality of signals subsequent the noise reduction to generate an output signal.

In another aspect, a method may involve a processor receiving a plurality of signals from a plurality of audio sensors corresponding to a plurality of channels responsive to sensing by the plurality of audio sensors. The method may also involve a non-coherent noise estimator in the processor performing a non-coherent noise reduction on one or more signals of the plurality of signals to suppress one or more non-coherent noises in each of the one or more signals by: (i) individually estimating a respective non-coherent noise corresponding to each frequency band of a plurality of frequency bands of each channel of the plurality of channels; and (ii) determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed. The method may further involve the processor combining the plurality of signals subsequent the noise reduction to generate an output signal.

In yet another aspect, an apparatus may include a plurality of audio sensors configured to sense a plurality of channels and a processor coupled to the plurality of audio sensors. The processor may receive a plurality of signals from the plurality of audio sensors responsive to sensing by the plurality of audio sensors. The processor may also perform a non-coherent noise reduction on one or more signals of the plurality of signals to suppress one or more non-coherent noises in each of the one or more signals based on a respective SNR associated with each of the one or more signals. The processor may further combine the plurality of signals subsequent the noise reduction to generate an output signal.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to non-coherent noise reduction for audio enhancement on a multi-microphone mobile device. According to the present disclosure, a number of possible solutions may be implemented separately or jointly. That is, although these possible solutions may be described below separately, two or more of these possible solutions may be implemented in one combination or another.

Figure 1:
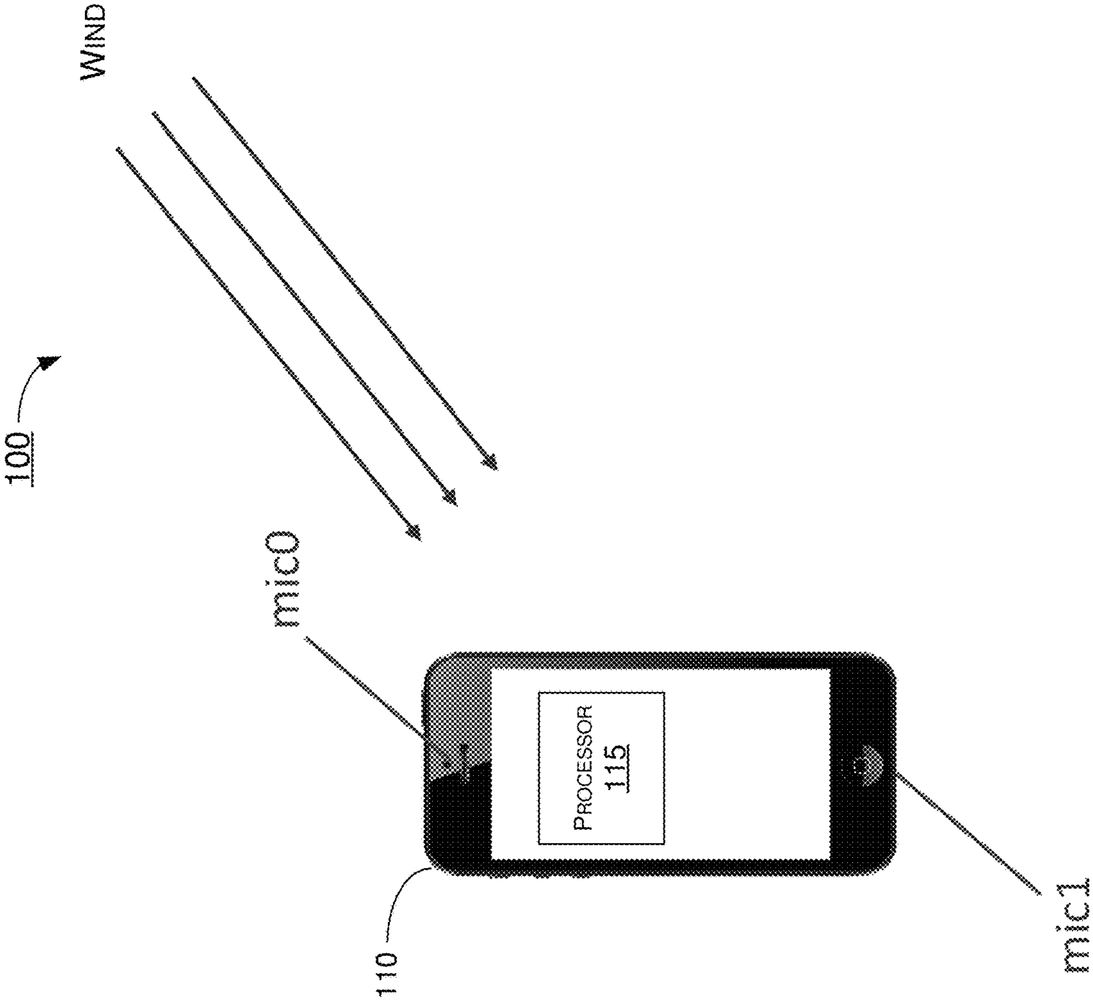
FIG. 1 is a diagram of an example environment in which various proposed schemes in accordance with the present disclosure may be implemented.

FIG. 1 illustrates an example environment 100 in which various proposed schemes in accordance with the present disclosure may be implemented. Referring to FIG. 1, example environment 100 may involve an apparatus 110 being exposed or subject to various noises, including coherent noises and non-coherent noises, which apparatus 110 may sense, detect or otherwise measure. Apparatus 110 may be a portable or mobile device with multiple audio sensors or microphones installed thereon, with each of the audio sensors or microphones mounted or otherwise disposed on a respective location on apparatus 110 to sense noises and sounds in the surrounding of apparatus 110. Apparatus 110 may be equipped with a processor 115 that is configured to implement various schemes proposed in the present disclosure to achieve non-coherent noise reduction. For simplicity, although there may be more than two audio sensors or microphones on apparatus 110, the multiple audio sensors or microphones on apparatus 110 are represented by a first microphone (mic0) and a second microphone (mic1) in FIG. 1. Thus, description below with respect to mic0 and mic1 is also applicable to cases in which there are more than two audio sensors or microphones.

In the example shown in FIG. 1, mic0 is disposed on a first location or side (e.g., top side) of apparatus 110 while mic1 is disposed on a second location or side (e.g., bottom side) of apparatus 110 different than the first location or side thereof. As mic0 and mic1 are disposed on different locations and/or sides of apparatus 110, mic0 may experience, and hence detect or otherwise sense, noises that are different from those detected or otherwise sensed by mic1. For instance, when a wind blows toward apparatus 110 in a direction such that mic0 is facing the wind, the magnitude and timing of a wind noise (or non-coherent noise) detected/sensed by mic0 would be greater and earlier than a wind noise (or non-coherent noise) detected/sensed by mic1. It is noteworthy that, although wind is depicted in FIG. 1 as a source of non-coherent noises, there may be other sources of non-coherent sources. For example, handling of apparatus 110 by a user (e.g., friction with the user's hand or clothing) may generate or otherwise cause non-coherent noises.

Under various proposed schemes in accordance with the present disclosure, processor 115 may receive from each of mic0 and mic1 a respective signal representative of the noise(s) detected/sensed by the respective microphone. Based on the received signals, processor 115 may compute a respective SNR with respect to each of mic0 and mic1 based on the detected/sensed noise(s). Under the various proposed schemes, processor 115 may suppress the signal from one of the microphones (e.g., mic0) experiencing greater non-coherent noise while increasing the proportion of the signal from the other microphone(s) (e.g., mic1) experiencing less non-coherent noise, thereby improving the SNR of a final output signal (e.g., an output signal to one or more speakers of apparatus 110 to result in an audio output by the one or more speakers). Processor 115 may be configured with one or more of the designs described below with respect to FIG. 2~FIG. 9 to achieve non-coherent noise reduction for audio enhancement on a multi-microphone mobile device.

Figure 2:
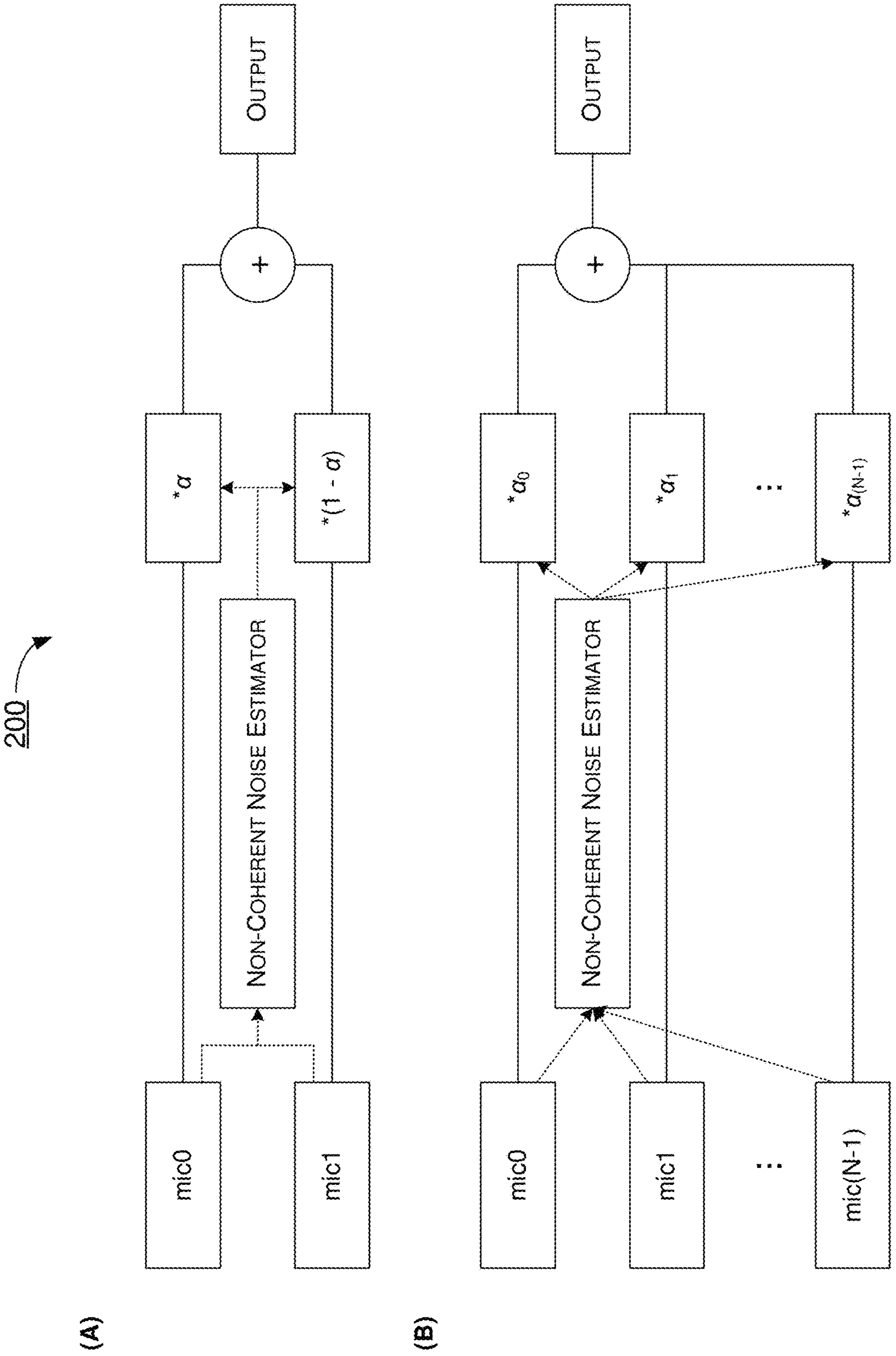
FIG. 2 is a diagram of an example design under a proposed scheme in accordance with the present disclosure.

FIG. 2 illustrates an example design 200 under a proposed scheme in accordance with the present disclosure. Specifically, part (A) of FIG. 2 shows design 200 in its simplest form when the number (N) of audio sensors or microphones is two (or N=2), and part (B) of FIG. 2 shows design 200 in its general form with N≥2. In design 200, a non-coherent noise estimator in processor 115 may be utilized to individually estimate a respective non-coherent noise for each channel of N channels (corresponding to N audio sensors or microphones) based on a respective signal received from each of the audio sensors or microphones. Based on the determined non-coherent noises sensed or detected by the N audio sensors or microphones, the non-coherent noise estimator may individually determine a respective SNR associated with each channel and, correspondingly, determine N gain control parameters each of which corresponding to a respective one of the N channels. In part (A) of FIG. 2, the N gain control parameters are represented by $*\alpha$ and $*(1-\alpha)$ for two channels, corresponding to two microphones mic0 and mic1. In part (B) of FIG. 2, the N gain control parameters are represented by $*\alpha_0$, $*\alpha_1$, . . . $*\alpha_{(N-1)}$ for N channels, corresponding to N microphones mic0, mic1 . . . mic(N−1). The gain control parameters may be determined in a way, such as that described below with respect to FIG. 3, to result in non-coherent noise(s) from one or more of the N channels being suppressed or otherwise reduced. As shown in FIG. 2, the respective signal of each channel (as detected or sensed by the respective audio sensor or microphone) may be multiplied by the respective gain control parameter and then combined together to result in a final output signal (which may be provided to one or more speakers to produce an audio output).

Figure 3:
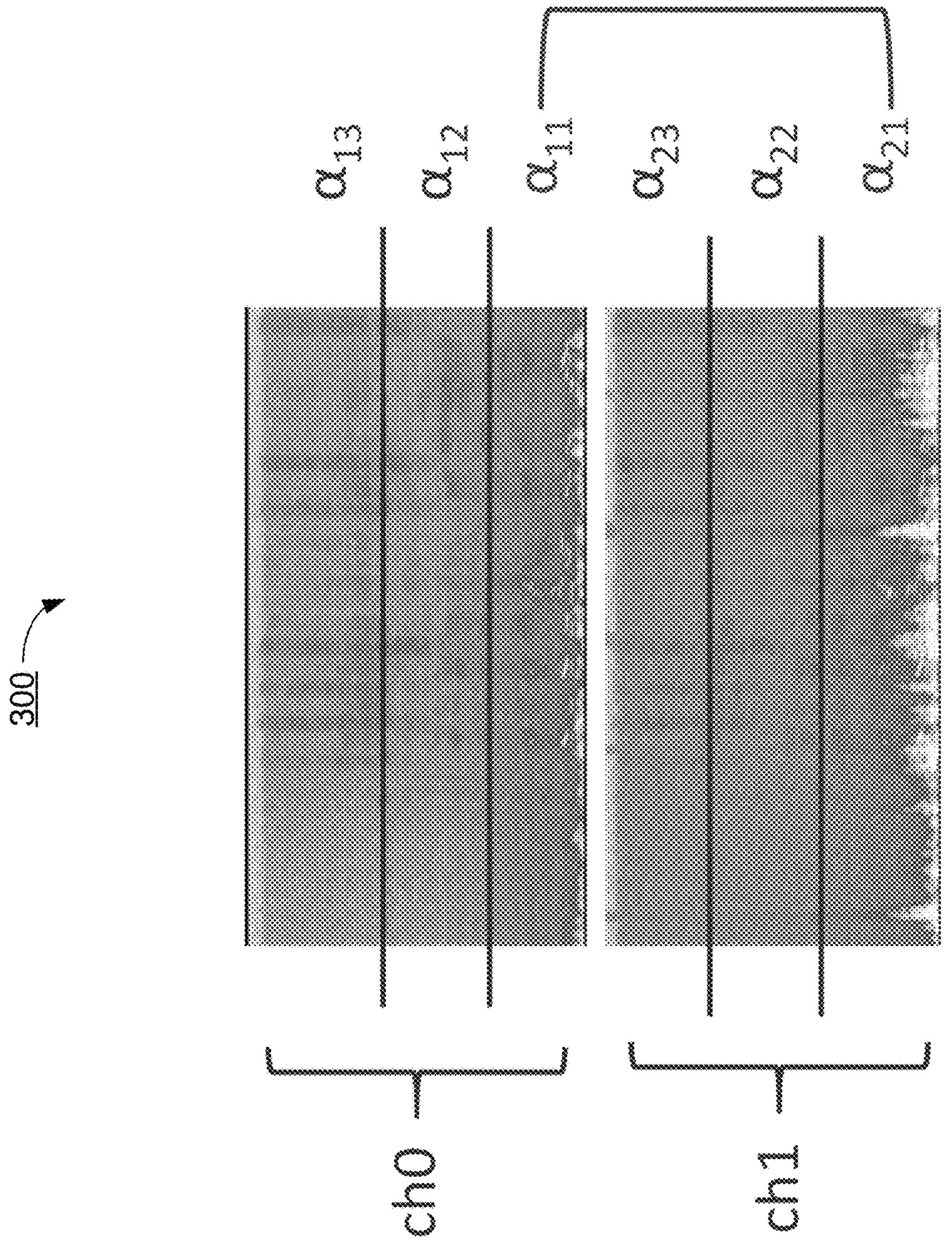
FIG. 3 is a diagram of an example scenario under a proposed scheme in accordance with the present disclosure.

FIG. 3 illustrates an example scenario 300 under a proposed scheme in accordance with the present disclosure. Under the proposed scheme, the respective gain control parameter of each channel (corresponding to each of N audio sensors or microphones) may be independently or individually determined at a frequency band level (or per-frequency band) for a plurality of frequency bands of each channel of a plurality of channels corresponding to a plurality of audio sensors or microphones. In the example shown in FIG. 3, each of two channels, ch0 and ch1, may be divided into three frequency bands. For instance, channel ch0 may be divided into respective low, medium and high frequency bands. Similarly, channel ch1 may also be divided into respective low, medium and high frequency bands. Under the proposed scheme, a respective gain control parameter may be determined for each of the frequency bands of each channel.

As shown in FIG. 3, the gain control parameters associated with the low, medium and high frequency bands of channel ch0 may be $\alpha_{11}$, $\alpha_{12}$ and $\alpha_{13}$, and the gain control parameters associated with the low, medium and high frequency bands of channel ch1 may be $\alpha_{21}$, $\alpha_{22}$ and $\alpha_{23}$. That is, under the proposed scheme, gain control parameters a u may be determined for each channel, with i−1 corresponding to the channel (e.g., i=1 for ch0 and i=2 for ch1) and j corresponding to the frequency band.

Under the proposed scheme, processor 115 may individually estimate a respective non-coherent noise corresponding to each frequency band of a plurality of frequency bands of each channel of the plurality of channels. Moreover, processor 115 may determine, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed. In the example shown in FIG. 3, the frequency bands $\alpha_{21}$ and $\alpha_{11}$ are high-noise frequency bands at the given moment. Accordingly, the non-coherent noise estimator may set the values as follows: $\alpha_{11}=1$ and $\alpha_{21}=0$, thereby suppressing the respective non-coherent noise associated with ch1 and frequency band 1 of ch1. The values of the gain control parameters of other frequency bands may be set to a predefined value (e.g., or another value that is greater than 0 and less than 1), thereby preserving stereo-sound characteristics in a final audio output. Thus, when the quantity of audio sensors or microphones is two (N=2), since one of two channels is suppressed for non-coherent noise reduction, the resultant output signal maybe a mono-audio output signal. On the other hand, when the quantity of audio sensors or microphones is three or more (N≥3), since one of the channels is suppressed for non-coherent noise reduction while at least two channels are not suppressed, the resultant output signal maybe a stereo-audio output signal.

Figure 4:
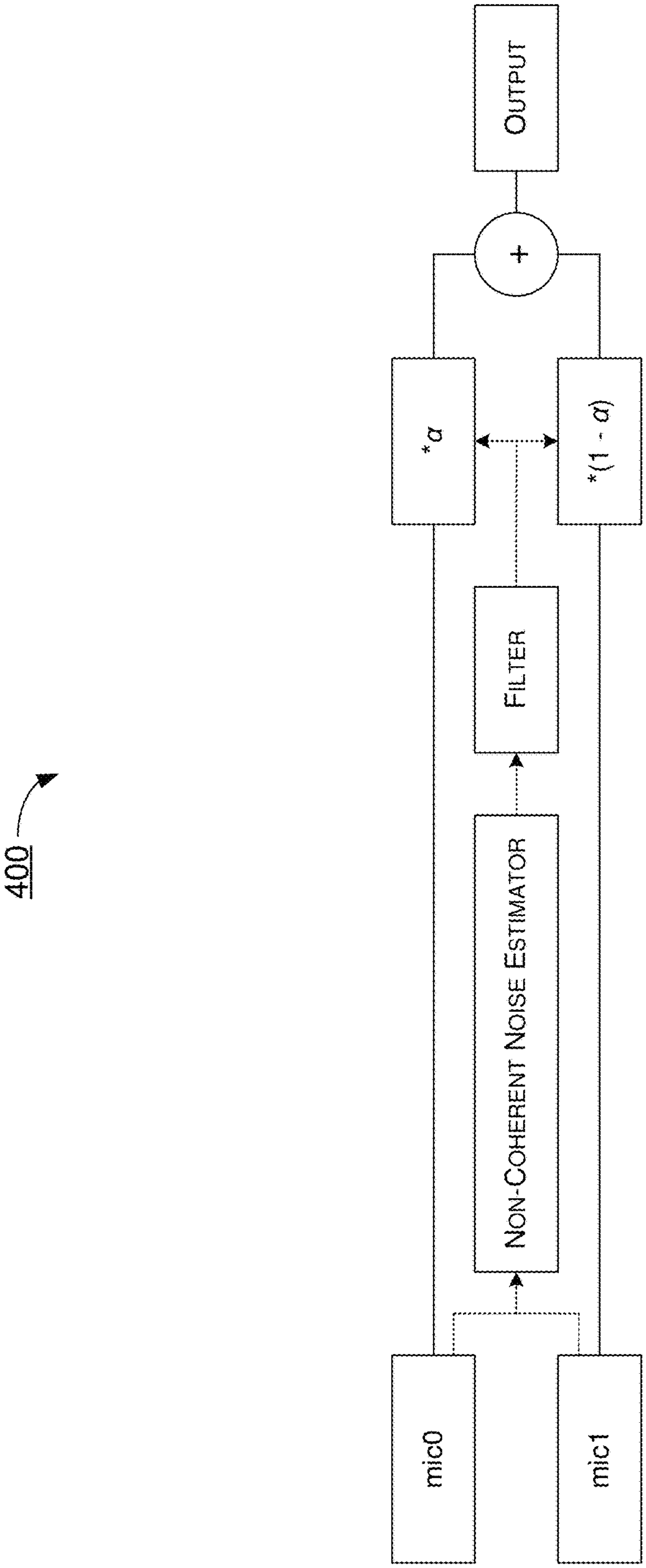
FIG. 4 is a diagram of an example design under a proposed scheme in accordance with the present disclosure.

FIG. 4 illustrates an example design 400 under a proposed scheme in accordance with the present disclosure. Design 400 may be similar to design 200 except that design 400 may additionally utilize a filter to filter an output of the non-coherent noise estimator. It is believed that, with the addition of the filter, excessive fluctuation in the values of gain control parameters may be mitigated or otherwise minimized.

Figure 5:
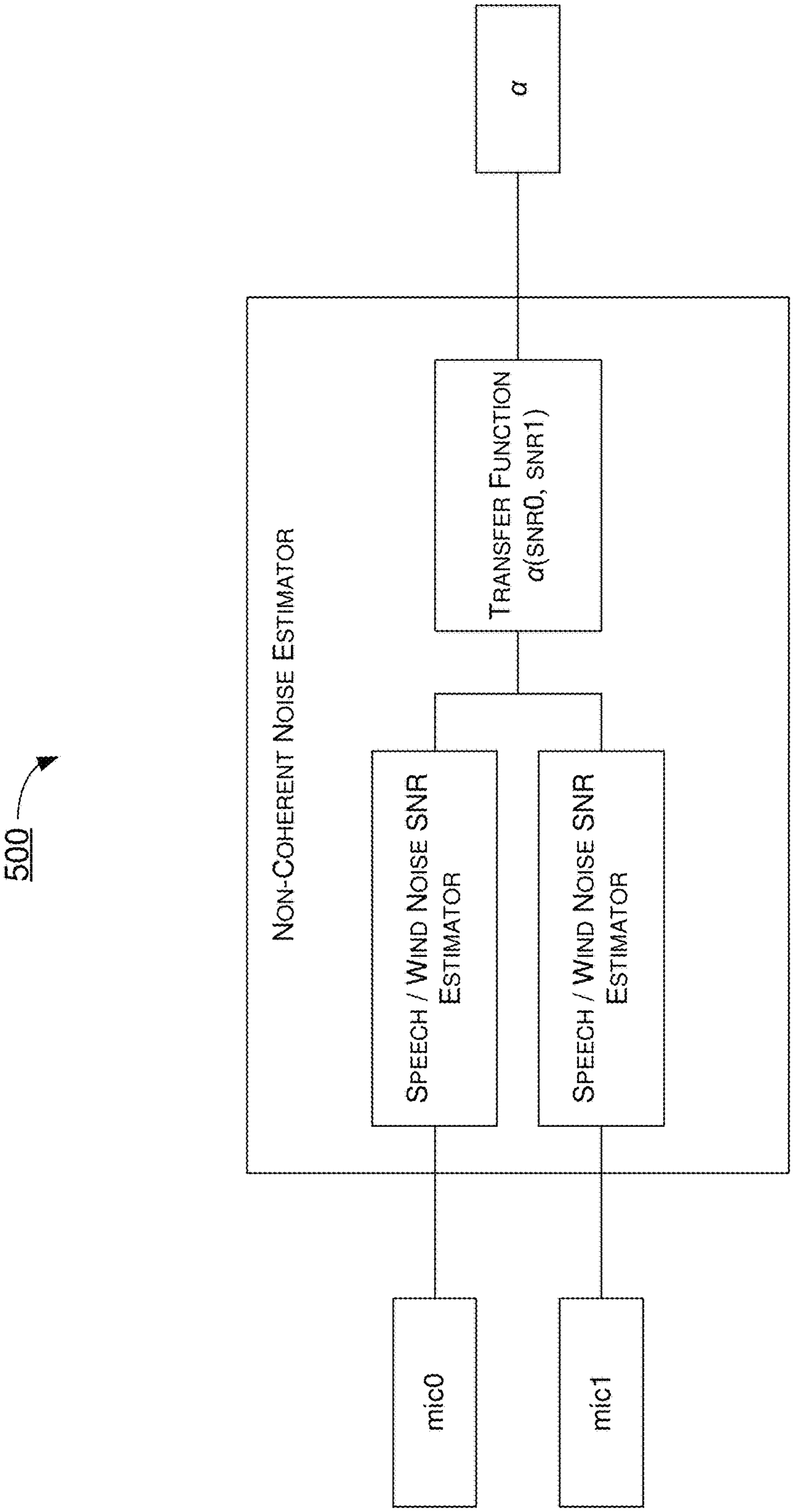
FIG. 5 is a diagram of an example design under a proposed scheme in accordance with the present disclosure.

FIG. 5 illustrates an example design 500 under a proposed scheme in accordance with the present disclosure. In design 500, a non-coherent noise estimator may include N non-coherent noise SNR estimators (each denoted as "speech/wind noise SNR estimator" in FIG. 5) for N channels corresponding to N audio sensors or microphones (represented by mic0 and mic1 in FIG. 5). Each of the N non-coherent noise SNR estimators may implement a deep learning model in estimating the respective non-coherent noise (and the respective SNR) of the respective channel. A transfer function may be performed on the outputs of the N non-coherent noise SNR estimators (e.g., values of SNRs associated with the N channels) to generate a respective gain control parameter (a) for each of the N channels. In the example shown in FIG. the transfer function may be expressed as: α(snr0, snr1)=0.5*(tan h(snr0−snr1)+1).

Figure 6:
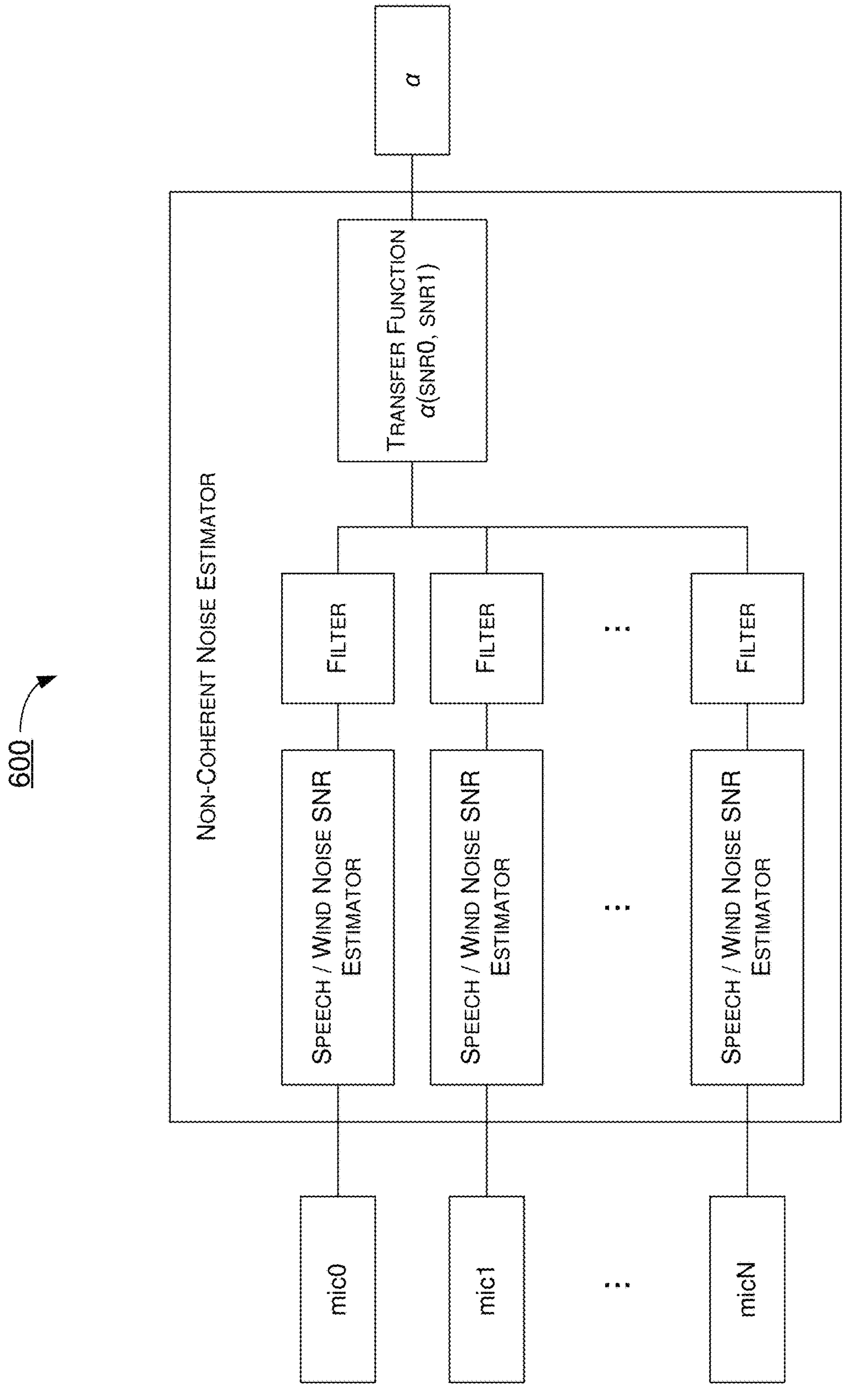
FIG. 6 is a diagram of an example design under a proposed scheme in accordance with the present disclosure.

FIG. 6 illustrates an example design 600 under a proposed scheme in accordance with the present disclosure. Design 600 may be similar to design 500 except that design 600 may additionally utilize a filter for each channel to filter an output of a respective non-coherent noise SNR estimator of the N non-coherent noise SNR estimators. It is believed that, with the addition of the filters, excessive fluctuation in the values of gain control parameters may be mitigated or otherwise minimized. In the example shown in FIG. 6, the transfer function may be expressed as $$\alpha(snr) = softmax(snr),\ \alpha_i = \frac{e^{snr_i}}{\sum_{j=1}^{N} snr_j}.$$

The use of softmax may guarantee that the sum of the N control gain values is 1.

Figure 7:
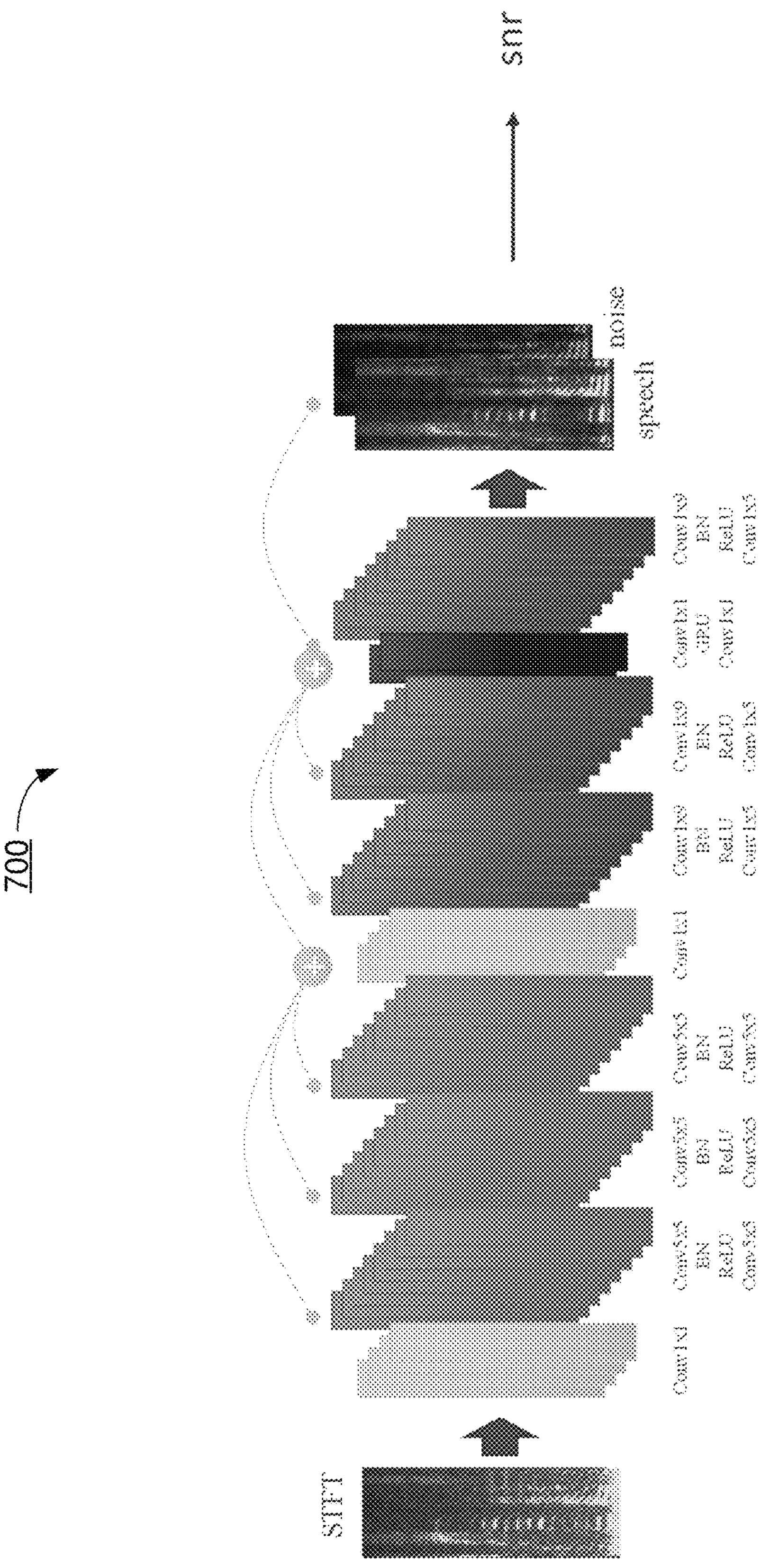
FIG. 7 is a diagram of an example scenario under a proposed scheme in accordance with the present disclosure.

FIG. 7 illustrates an example scenario 700 under a proposed scheme in accordance with the present disclosure. Scenario 700 shows an example of a deep learning model for SNR estimation. In the deep learning model, a short-time Fourier transform (STFT) may be taken as an input, and an output of the deep learning model may be a SNR value (denoted as "snr" in FIG. 7).

Figure 8:
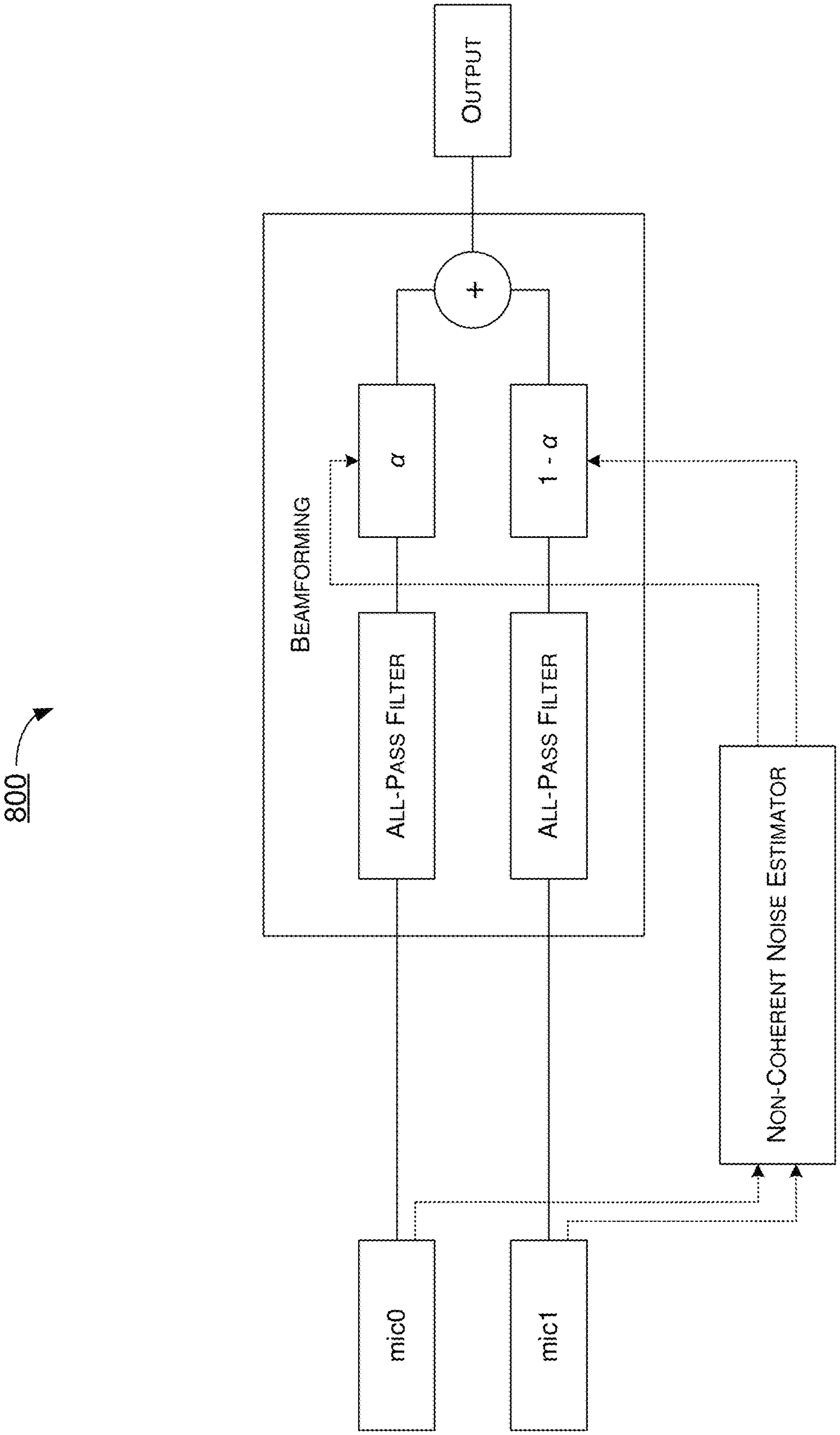
FIG. 8 is a diagram of an example design under a proposed scheme in accordance with the present disclosure.

FIG. 8 illustrates an example design 800 under a proposed scheme in accordance with the present disclosure. Design 800 may be similar to design 200 except that design 800 may additionally perform beamforming by utilizing N all-pass filters for the N channels corresponding to the N audio sensors or microphones. In design 800, in addition to a non-coherent noise estimator, the N signals of the N channels may be also provided to the N all-pass channels to be filtered before being multiplied with the gain control parameters (denoted by α and 1−α in FIG. 8).

Figure 9:
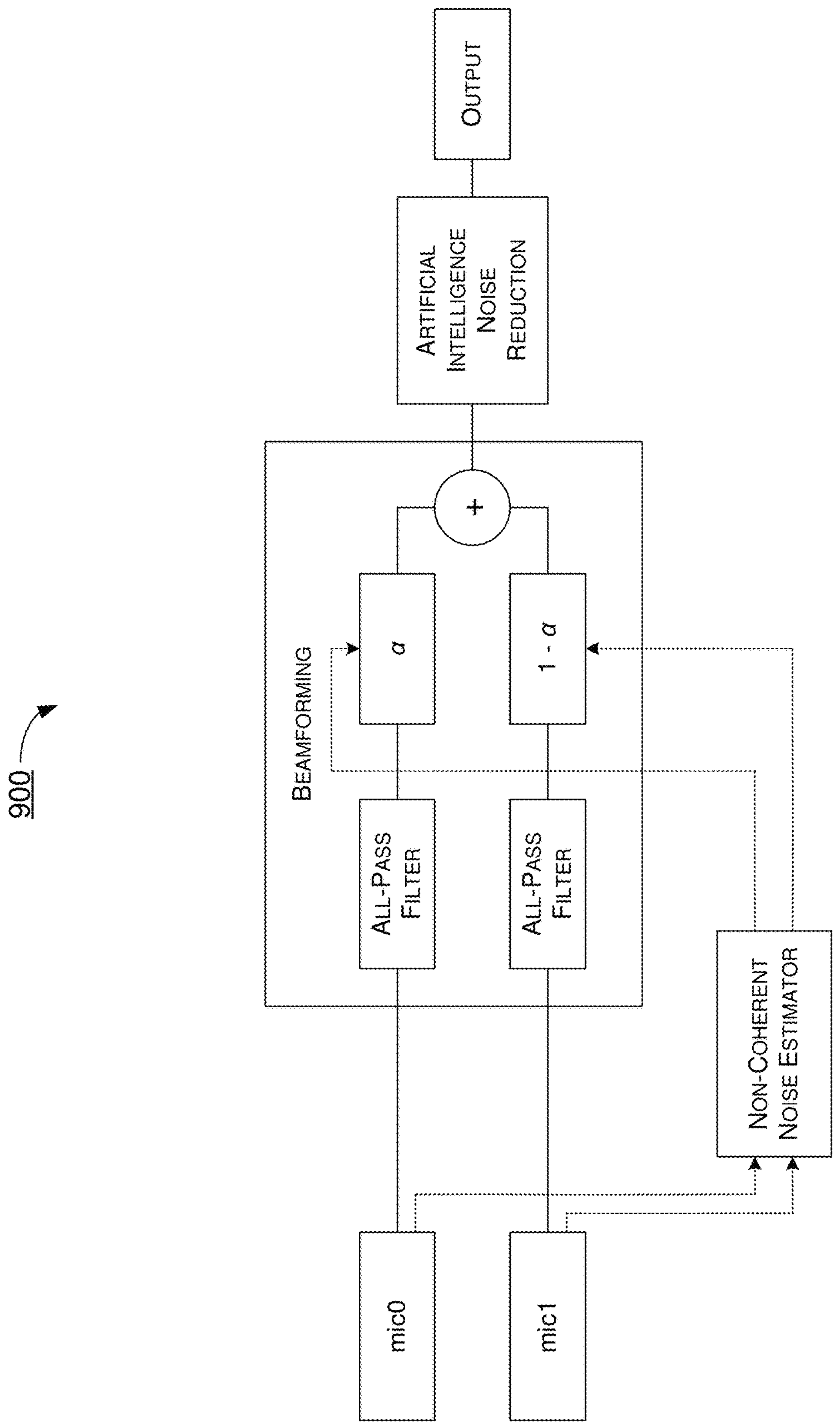
FIG. 9 is a diagram of an example design under a proposed scheme in accordance with the present disclosure.

FIG. 9 illustrates an example design 900 under a proposed scheme in accordance with the present disclosure. Design 900 may be similar to design 800 except that design 900 may additionally include an artificial-intelligence (AI) noise reduction (AINR) functional block to further reduce noise before outputting a final output signal. Thus, compared to design 200, design 900 may additionally perform beamforming and AINR before generating the final output signal.

Illustrative Implementations

Figure 10:
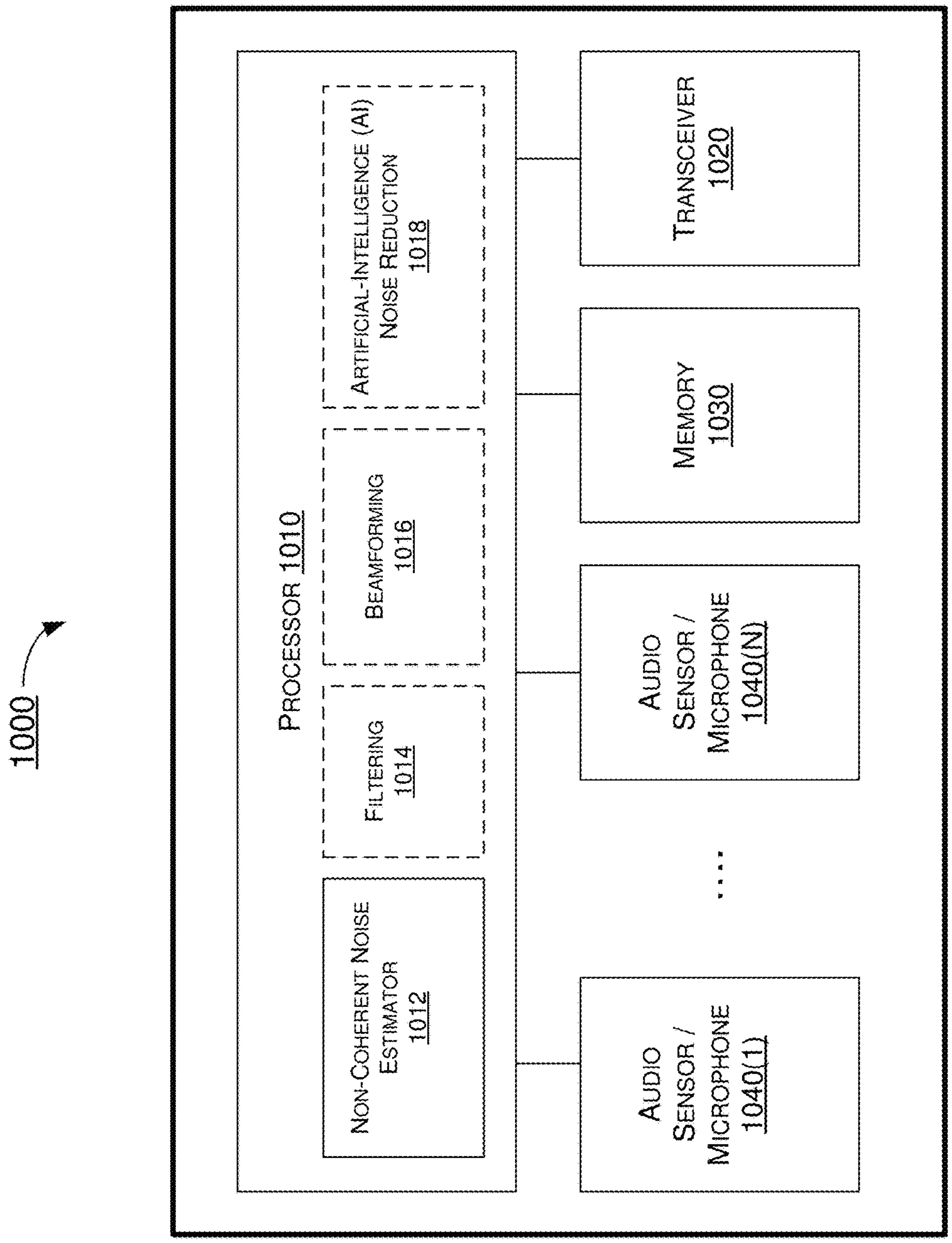
FIG. 10 is a diagram of an example apparatus in accordance with an implementation of the present disclosure.

FIG. 10 illustrates an example apparatus 1000 in accordance with an implementation of the present disclosure. Apparatus 1000 may perform various functions to implement schemes, techniques, processes and methods described herein pertaining to non-coherent noise reduction for audio enhancement on a multi-microphone mobile device, including scenarios/schemes described above as well as process(es) described below.

Apparatus 1000 may be a part of an electronic apparatus, which may be a user equipment (UE) such as a portable or mobile apparatus, a wearable apparatus, a wireless communication apparatus or a computing apparatus. For instance, apparatus 1000 may be implemented in a smartphone, a smartwatch, a personal digital assistant, a digital camera, or a computing equipment such as a tablet computer, a laptop computer or a notebook computer. Apparatus 1000 may also be a part of a machine type apparatus, which may be an Internet-of-Things (IoT), narrowband IoT (NB-IoT) or industrial IoT (IIoT) apparatus such as an immobile or a stationary apparatus, a home apparatus, a wire communication apparatus or a computing apparatus. For instance, apparatus 1000 may be implemented in a smart thermostat, a smart fridge, a smart door lock, a wireless speaker or a home control center. Alternatively, apparatus 1000 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 1000 may include at least some of those components shown in FIG. 10 such as a processor 1010, for example. Apparatus 1000 may further include one or more other components not pertinent to the proposed scheme of the present disclosure (e.g., internal power supply, display device and/or user interface device), and, thus, such component(s) of apparatus 1000 are neither shown in FIG. 10 nor described below in the interest of simplicity and brevity.

In one aspect, processor 1010 may be implemented in the form of one or more single-core processors, one or more multi-core processors, one or more RISC processors, or one or more CISC processors. That is, even though a singular term "a processor" is used herein to refer to processor 1010, processor 1010 may include multiple processors in some implementations and a single processor in other implementations in accordance with the present disclosure. In another aspect, processor 1010 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 1010 is a special-purpose machine specifically designed, arranged and configured to perform specific tasks including non-coherent noise reduction for audio enhancement on a multi-microphone mobile device in accordance with various implementations of the present disclosure.

In some implementations, apparatus 1000 may also include a transceiver 1020 coupled to processor 1010 and capable of transmitting and receiving data (e.g., wirelessly and/or via a wired connection). In some implementations, apparatus 1000 may further include a memory 1030 coupled to processor 1010 and capable of being accessed by processor 1010 and storing data therein. Apparatus 1000 may also include audio sensors or microphones 1040(1)~1040(N), with N being a positive integer and N>1. Each of audio sensors or microphones 1040(1)~1040(N) may be configured to detect or otherwise sense audio waves (e.g., caused by coherent noise(s) and/or non-coherent noise(s)) to produce a signal indicative of the detected/sensed noise(s).

Apparatus 1000 may be a schematic representation of apparatus 110 in example environment 100. Accordingly, processor 1010 may be an example implementation of processor 115. In some implementations, processor 1010 may at least include hardware (e.g., electronic circuitry) configured to implement the non-coherent noise estimator, filters, beamforming functional block, and AINR functional block described herein to achieve non-coherence noise reduction. In some implementations, processor 1010 may at least include hardware (e.g., electronic circuitry) as well as firmware and/or middleware configured to implement the non-coherent noise estimator, filters, beamforming functional block, and AINR functional block described herein to achieve non-coherence noise reduction. In some implementations, memory 1030 may be configured to store software instructions which may be executed by the electronic circuitry of processor 1010 to implement the non-coherent noise estimator, filters, beamforming functional block, and AINR functional block described herein to achieve non-coherence noise reduction.

As shown in FIG. 10, processor 1010 may include a non-coherent noise estimator circuit 1012 configured to implement various proposed schemes described herein including those described above with respect to FIG. 1~FIG. 9. Optionally, processor 1010 may also include one or more of a filtering circuit 1014, a beamforming circuit 1016, and an AINR circuit 1018 that, together with the non-coherent noise estimator circuit 1012, may be configured to implement various proposed schemes described herein including some or all of those described above with respect to FIG. 1~FIG. 9.

In one aspect under some proposed schemes pertaining to non-coherent noise reduction for audio enhancement on a multi-microphone mobile device in accordance with the present disclosure, processor 1010 may receive a plurality of signals from audio sensors or microphones 1040(1)~1040(N) corresponding to a plurality of channels responsive to sensing by audio sensors or microphones 1040(1)~1040(N). Additionally, processor 1010 may perform a non-coherent noise reduction on one or more signals of the plurality of signals to suppress one or more non-coherent noises in each of the one or more signals based on a respective SNR associated with each of the one or more signals. Moreover, processor 1010 may combine the plurality of signals subsequent the noise reduction to generate an output signal.

In some implementations, in performing the non-coherent noise reduction, processor 1010 may perform certain operations. For instance, processor 1010 may individually estimate a respective non-coherent noise corresponding to each frequency band of a plurality of frequency bands of each channel of the plurality of channels. Additionally, processor 1010 may determine, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed.

In some implementations, in performing the non-coherent noise reduction, processor 1010 may perform other operations. For instance, processor 1010 may individually estimate a respective non-coherent noise associated with each channel of the plurality of channels to determine, for each channel, a plurality of gain control parameters each of which corresponding to a respective frequency band of a plurality of frequency bands of each channel of the plurality of channels. Moreover, processor 1010 may suppress the respective non-coherent noise associated with at least one channel of the plurality of channels based on a combination of the gain control parameters corresponding to the at least one channel.

In some implementations, in performing the non-coherent noise reduction, processor 1010 may perform the non-coherent noise reduction by using a deep learning model or machine learning.

In some implementations, in combining the plurality of signals, processor 1010 may filter the plurality of signals subsequent the noise reduction before combining the plurality of signals.

In some implementations, the output signal may include a mono-audio output signal in an event that a quantity of the plurality of audio sensors is two (or N=2). Alternatively, the output signal may include a stereo-audio output signal in an event that a quantity of the plurality of audio sensors is three or more (or N≥3).

In some implementations, processor 1010 may perform additional operations. For instance, processor 1010 may perform beamforming on the plurality of signals using: (i) the plurality of signals subsequent filtering by all-pass filters; and (ii) an output of the non-coherent noise estimator to generate the output signal. In some implementations, processor 1010 may further perform AINR on the plurality of signals subsequent the beamforming to generate the output signal.

In another aspect under some proposed schemes pertaining to non-coherent noise reduction for audio enhancement on a multi-microphone mobile device in accordance with the present disclosure, processor 1010 may receive a plurality of signals from audio sensors or microphones 1040(1)~1040(N) corresponding to a plurality of channels responsive to sensing by audio sensors or microphones 1040(1)~1040(N). Moreover, processor 1010 may perform a non-coherent noise reduction on one or more signals of the plurality of signals to suppress one or more non-coherent noises in each of the one or more signals by: (i) individually estimating a respective non-coherent noise corresponding to each frequency band of a plurality of frequency bands of each channel of the plurality of channels; and (ii) determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed. Furthermore, processor 1010 may combine the plurality of signals subsequent the noise reduction to generate an output signal.

In some implementations, in performing the non-coherent noise reduction, processor 1010 may perform the non-coherent noise reduction by using a deep learning model or machine learning.

In some implementations, in combining the plurality of signals, processor 1010 may filter the plurality of signals subsequent the noise reduction before combining the plurality of signals.

In some implementations, the output signal may include a mono-audio output signal in an event that a quantity of the plurality of audio sensors is two (or N=2). Alternatively, the output signal may include a stereo-audio output signal in an event that a quantity of the plurality of audio sensors is three or more (or N≥3).

In some implementations, processor 1010 may perform additional operations. For instance, processor 1010 may perform beamforming on the plurality of signals using: (i) the plurality of signals subsequent filtering by all-pass filters; and (ii) an output of the non-coherent noise estimator to generate the output signal. In some implementations, processor 1010 may further perform AINR on the plurality of signals subsequent the beamforming to generate the output signal.

Illustrative Processes

Figure 11:
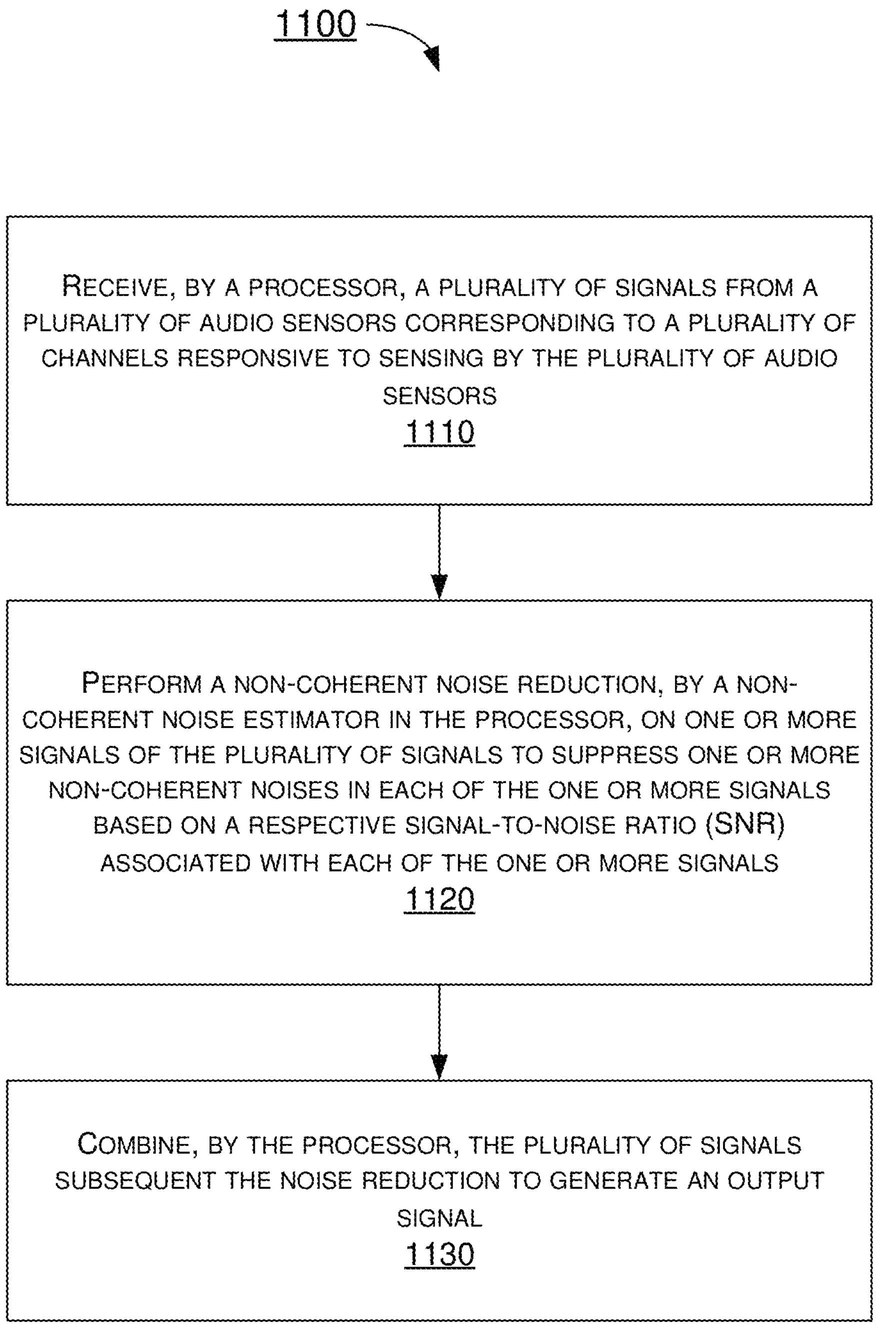
FIG. 11 is a flowchart of an example process in accordance with an implementation of the present disclosure.

FIG. 11 illustrates an example process 1100 in accordance with an implementation of the present disclosure. Process 1100 may be an example implementation of schemes described above whether partially or completely, with respect to non-coherent noise reduction for audio enhancement on a multi-microphone mobile device in accordance with the present disclosure. Process 1100 may represent an aspect of implementation of features of apparatus 1000. Process 1100 may include one or more operations, actions, or functions as illustrated by blocks 1110, 1120 and 1130. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by apparatus 1000. Solely for illustrative purposes and without limitation, process 1100 is described below in the context of apparatus 1000 implemented in or as a multi-microphone mobile device. Process 1100 may begin at block 1110.

At 1110, process 1100 may involve processor 1010 of apparatus 1000 receiving a plurality of signals from audio sensors or microphones 1040(1)~1040(N) corresponding to a plurality of channels responsive to sensing by audio sensors or microphones 1040(1)~1040(N). Process 1100 may proceed from 1110 to 1120.

At 1120, process 1100 may involve processor 1010 performing a non-coherent noise reduction on one or more signals of the plurality of signals to suppress one or more non-coherent noises in each of the one or more signals based on a respective SNR associated with each of the one or more signals. Process 1100 may proceed from 1120 to 1130.

At 1130, process 1100 may involve processor 1010 combining the plurality of signals subsequent the noise reduction to generate an output signal.

In some implementations, in performing the non-coherent noise reduction, process 1100 may involve processor 1010 performing certain operations. For instance, process 1100 may involve processor 1010 individually estimating a respective non-coherent noise corresponding to each frequency band of a plurality of frequency bands of each channel of the plurality of channels. Additionally, process 1100 may involve processor 1010 determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed.

In some implementations, in performing the non-coherent noise reduction, process 1100 may involve processor 1010 performing other operations. For instance, process 1100 may involve processor 1010 individually estimating a respective non-coherent noise associated with each channel of the plurality of channels to determine, for each channel, a plurality of gain control parameters each of which corresponding to a respective frequency band of a plurality of frequency bands of each channel of the plurality of channels. Moreover, process 1100 may involve processor 1010 suppressing the respective non-coherent noise associated with at least one channel of the plurality of channels based on a combination of the gain control parameters corresponding to the at least one channel.

In some implementations, in performing the non-coherent noise reduction, process 1100 may involve processor 1010 performing the non-coherent noise reduction by using a deep learning model or machine learning.

In some implementations, in combining the plurality of signals, process 1100 may involve processor 1010 filtering the plurality of signals subsequent the noise reduction before combining the plurality of signals.

In some implementations, the output signal may include a mono-audio output signal in an event that a quantity of the plurality of audio sensors is two (or N=2). Alternatively, the output signal may include a stereo-audio output signal in an event that a quantity of the plurality of audio sensors is three or more (or N≥3).

In some implementations, process 1100 may involve processor 1010 performing additional operations. For instance, process 1100 may involve processor 1010 performing beamforming on the plurality of signals using: (i) the plurality of signals subsequent filtering by all-pass filters; and (ii) an output of the non-coherent noise estimator to generate the output signal. In some implementations, process 1100 may further involve processor 1010 performing AINR on the plurality of signals subsequent the beamforming to generate the output signal.

Figure 12:
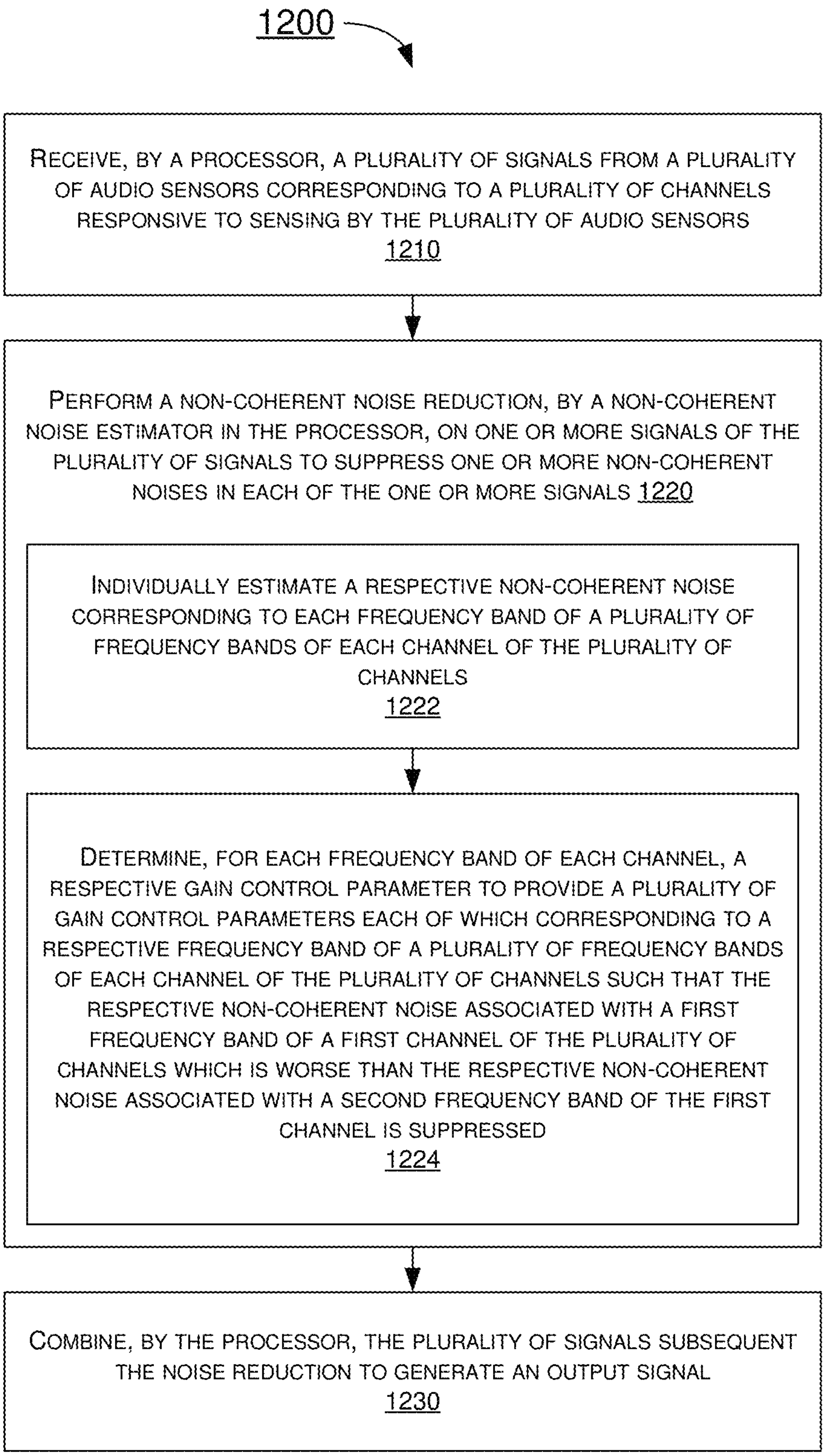
FIG. 12 is a flowchart of an example process in accordance with an implementation of the present disclosure.

FIG. 12 illustrates an example process 1200 in accordance with an implementation of the present disclosure. Process 1200 may be an example implementation of schemes described above whether partially or completely, with respect to non-coherent noise reduction for audio enhancement on a multi-microphone mobile device in accordance with the present disclosure. Process 1200 may represent an aspect of implementation of features of apparatus 1000. Process 1200 may include one or more operations, actions, or functions as illustrated by blocks 1210, 1220 and 1230. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Process 1200 may be implemented by apparatus 1000. Solely for illustrative purposes and without limitation, process 1200 is described below in the context of apparatus 1000 implemented in or as a multi-microphone mobile device. Process 1200 may begin at block 1210.

At 1210, process 1200 may involve processor 1010 of apparatus 1000 receiving a plurality of signals from audio sensors or microphones 1040(1)~1040(N) corresponding to a plurality of channels responsive to sensing by audio sensors or microphones 1040(1)~1040(N). Process 1200 may proceed from 1210 to 1220.

At 1220, process 1200 may involve processor 1010 performing a non-coherent noise reduction, by a non-coherent noise estimator in the processor, on one or more signals of the plurality of signals to suppress one or more non-coherent noises in each of the one or more signals by executing operations represented by subblocks 1222 and 1224. Process 1200 may proceed from 1220 to 1230.

At 1230, process 1200 may involve processor 1010 combining the plurality of signals subsequent the noise reduction to generate an output signal.

At 1222, process 1200 may involve processor 1010 individually estimating a respective non-coherent noise corresponding to each frequency band of a plurality of frequency bands of each channel of the plurality of channels. Process 1200 may proceed from 1222 to 1224.

At 1224, process 1200 may involve processor 1010 determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed.

In some implementations, in performing the non-coherent noise reduction, process 1200 may involve processor 1010 performing the non-coherent noise reduction by using a deep learning model or machine learning.

In some implementations, in combining the plurality of signals, process 1200 may involve processor 1010 filtering the plurality of signals subsequent the noise reduction before combining the plurality of signals.

In some implementations, the output signal may include a mono-audio output signal in an event that a quantity of the plurality of audio sensors is two (or N=2). Alternatively, the output signal may include a stereo-audio output signal in an event that a quantity of the plurality of audio sensors is three or more (or N≥3).

In some implementations, process 1200 may involve processor 1010 performing additional operations. For instance, process 1200 may involve processor 1010 performing beamforming on the plurality of signals using: (i) the plurality of signals subsequent filtering by all-pass filters; and (ii) an output of the non-coherent noise estimator to generate the output signal. In some implementations, process 1200 may further involve processor 1010 performing AINR on the plurality of signals subsequent the beamforming to generate the output signal.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor, a plurality of signals from a plurality of audio sensors corresponding to a plurality of channels responsive to sensing by the plurality of audio sensors;

performing non-coherent noise reduction, by a non-coherent noise estimator in the processor, on one or more signals of the plurality of signals to suppress at least one non-coherent noise in each of the one or more signals based on a respective signal-to-noise ratio (SNR) associated with each of the one or more signals;

combining, by the processor, the plurality of signals subsequent the noise reduction to generate an output signal; and performing beamforming on the plurality of signals using:

the plurality of signals subsequent filtering by all-pass filters; and an output of the non-coherent noise estimator to generate the output signal.

2. The method of claim 1, wherein the performing of the non-coherent noise reduction comprises:

individually estimating a respective non-coherent noise corresponding to each frequency band of a plurality of frequency bands of each channel of the plurality of channels; and determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed.

3. The method of claim 1, wherein the performing of the non-coherent noise reduction comprises:

individually estimating a respective non-coherent noise associated with each channel of the plurality of channels to determine, for each channel, a plurality of gain control parameters each of which corresponding to a respective frequency band of a plurality of frequency bands of each channel of the plurality of channels; and suppressing the respective non-coherent noise associated with at least one channel of the plurality of channels based on a combination of the gain control parameters corresponding to the at least one channel.

4. The method of claim 1, wherein the performing of the non-coherent noise reduction comprises performing the non-coherent noise reduction by using a deep learning model or machine learning.

5. The method of claim 1, wherein the combining of the plurality of signals comprises filtering the plurality of signals subsequent the noise reduction before combining the plurality of signals.

6. The method of claim 1, wherein:

the output signal comprises a mono-audio output signal in an event that a quantity of the plurality of audio sensors is two; and the output signal comprises a stereo-audio output signal in an event that a quantity of the plurality of audio sensors is three or more.

7. The method of claim 1, further comprising:

performing artificial-intelligence (AI) noise reduction on the plurality of signals subsequent the beamforming to generate the output signal.

8. A method, comprising:

receiving, by a processor, a plurality of signals from a plurality of audio sensors corresponding to a plurality of channels responsive to sensing by the plurality of audio sensors;

performing non-coherent noise reduction, by a non-coherent noise estimator in the processor, on one or more signals of the plurality of signals to suppress at least one non-coherent noise in each of the one or more signals by:

individually estimating a respective non-coherent noise corresponding to each frequency band of a plurality of frequency bands of each channel of the plurality of channels; and determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed;

combining, by the processor, the plurality of signals subsequent the noise reduction to generate an output signal; and performing beamforming on the plurality of signals using:

the plurality of signals subsequent filtering by all-pass filters; and an output of the non-coherent noise estimator to generate the output signal.

9. The method of claim 8, wherein the performing of the non-coherent noise reduction comprises performing the non-coherent noise reduction by using a deep learning model or machine learning.

10. The method of claim 8, wherein the combining of the plurality of signals comprises filtering the plurality of signals subsequent the noise reduction before combining the plurality of signals.

11. The method of claim 8, wherein:

the output signal comprises a mono-audio output signal in an event that a quantity of the plurality of audio sensors is two; and the output signal comprises a stereo-audio output signal in an event that a quantity of the plurality of audio sensors is three or more.

12. The method of claim 8, further comprising:

performing artificial-intelligence (AI) noise reduction on the plurality of signals subsequent the beamforming to generate the output signal.

13. An apparatus, comprising:

a plurality of audio sensors configured to sense a plurality of channels; and a processor coupled to the plurality of audio sensors, the processor configured to perform operations comprising:

receiving a plurality of signals from the plurality of audio sensors responsive to sensing by the plurality of audio sensors;

performing a non-coherent noise reduction, by a non-coherent noise estimator in the processor, on one or more signals of the plurality of signals to suppress at least one non-coherent noise in each of the one or more signals based on a respective signal-to-noise ratio (SNR) associated with each of the one or more signals;

combining the plurality of signals subsequent the noise reduction to generate an output signal;

performing beamforming on the plurality of signals using:

the plurality of signals subsequent filtering by all-pass filters; and an output of the non-coherent noise estimator to generate the output signal; and performing artificial-intelligence (AI) noise reduction on the plurality of signals subsequent the beamforming to generate the output signal.

14. The apparatus of claim 13, wherein, in performing the non-coherent noise reduction, the processor is configured to perform operations comprising:

individually estimating a respective non-coherent noise corresponding to each frequency band of a plurality of frequency bands of each channel of the plurality of channels; and determining, for each frequency band of each channel, a respective gain control parameter to provide a plurality of gain control parameters each of which corresponding to a respective frequency band of a plurality of frequency bands of each channel of the plurality of channels such that the respective non-coherent noise associated with a first frequency band of a first channel of the plurality of channels which is worse than the respective non-coherent noise associated with a second frequency band of the first channel is suppressed.

15. The apparatus of claim 13, wherein, in performing the non-coherent noise reduction, the processor is configured to perform the non-coherent noise reduction by using a deep learning model or machine learning.

16. The apparatus of claim 13, wherein, in combining the plurality of signals, the processor is configured to filter the plurality of signals subsequent the noise reduction before combining the plurality of signals.

17. The apparatus of claim 13, wherein:

the output signal comprises a mono-audio output signal in an event that a quantity of the plurality of audio sensors is two; and the output signal comprises a stereo-audio output signal in an event that a quantity of the plurality of audio sensors is three or more.

* * * * *